United States Patent [19]

Blanshine

[11] 3,847,356
[45] Nov. 12, 1974

[54] SCRAPING PADDLES FOR UNLOADING AND SPREADING MECHANISM USED WITH MANURE SPREADERS

[75] Inventor: Allison W. Blanshine, Lititz, Pa.

[73] Assignee: Sperry Rand Corporation, New Holland, Pa.

[22] Filed: May 29, 1973

[21] Appl. No.: 364,781

[52] U.S. Cl.................. 239/662, 239/672, 239/679
[51] Int. Cl............................................. A01c 23/00
[58] Field of Search .......... 239/662, 658, 667, 670, 239/671, 672, 673, 679, 123

[56] References Cited
UNITED STATES PATENTS

| | | | |
|---|---|---|---|
| 3,123,363 | 3/1964 | Hedtke | 239/662 X |
| 3,175,830 | 3/1965 | Lepp | 239/679 |
| 3,185,326 | 5/1965 | Vanderloop | 239/662 X |
| 3,722,802 | 3/1973 | Kreinbaum | 239/658 |

Primary Examiner—M. Henson Wood, Jr.
Assistant Examiner—John J. Love
Attorney, Agent, or Firm—Louis J. Virelli, Jr.; Frank A. Seemar; John R. Flanagan

[57] ABSTRACT

Scraping paddles adapted to be placed on the respective ends of unloading and spreading mechanism, used with manure spreaders, to scrape and discharge material positioned adjacent the sidewalls of said spreader. Such paddles are aligned and positioned on the mechanism, in such a way, as to create a leading edge, which moves adjacent the respective sidewall of said manure spreader, and a trailing edge which moves further away from the respective sidewall of the spreader than the leading edge. The leading edge of said scraping paddles are formed so that it is capable of engaging, shearing, discharging and spreading material which may become positioned adjacent the respective sidewalls of said spreader without interfering with the operation of the other paddles of said mechanism.

6 Claims, 3 Drawing Figures

PATENTED NOV 12 1974　　　　　　　　　　3,847,356

SCRAPING PADDLES FOR UNLOADING AND SPREADING MECHANISM USED WITH MANURE SPREADERS

BACKGROUND OF THE INVENTION

The present invention relates generally to improvements in manure spreaders and more particularly to an improved end paddle alignment for the unloading and spreading mechanisms used with manure spreaders.

Manure spreaders generally consist of a spreader box into which material which is to be distributed is placed, a conveyor within the spreader box which moves the material towards the rear of the spreader, and finally an unloading and spreading mechanism located at the rear of the spreader for discharging the stored material. These individual components of the manure spreaders have been known and used for approximately 100 years. Throughout this time, many necessary and valuable improvements have been made on the respective component parts. One of the most frequently modified components is the unloading and spreading mechanism, commonly referred to as the beater mechanism.

One type manure spreader employs a single beater mechanism with paddles aligned in such a way as to not only spread material but to shred it as well. Such a mechanism is shown in the U.S. Pat. No. granted to C. A. Smith et al. 3,228,701. This type of mechanism has proven generally satisfactory except when it is used with certain materials having a consistency such that it (the material) adheres to the sidewalls of the spreader box. When the mechanism as described in the Smith patent encounters such material, the end paddles of the mechanism act to further compress and pack the material between the sidewalls and the respective end paddles of the mechanism. This compressed material often freezes or solidifies so that the mechanism cannot shred and discharge this material; but more important, this solidified material creates an obstacle which the rotating paddles encounter on each revolution thereby causing severe stress and shock forces which act upon the end paddles and the mechanism as a whole.

SUMMARY OF THE INVENTION

It is, therefore, the main object of this invention to provide an improved alignment of end paddles to be used in connection with an unloading and spreading mechanism, similar to the one set out in the U.S. Pat. No. to Smith et al. 3,228,701 so that material which may adhere to the sidewalls of the spreader box will be effectively unloaded.

Another object of this invention is to provide an end paddle, operably connected to the unloading and spreading mechanism, which will effectively scrape and discharge material away from the sidewalls of the spreader box thereby preventing any build up of material in said box during the unloading operation.

Another object of this invention is to provide scraping paddles, for an unloading and spreading mechanism which will scrape, unload and spread material positioned adjacent the sidewalls of the spreader box thereby enabling the material transported by the spreader to be more efficiently and effectively discharged.

Another object of this invention is to provide scraping paddles for an unloading and spreading mechanism which will operate with a minimum amount of forces acting upon it.

These and other objects and advantages of this invention will be apparent to those skilled in the art after a consideration of the following detailed description, taken in conjunction with the accompanying drawings, in which the preferred form of this invention is illustrated.

IN THE DRAWINGS

DESCRIPTION OF THE PREFERRED EMBODIMENT

Figure 1:
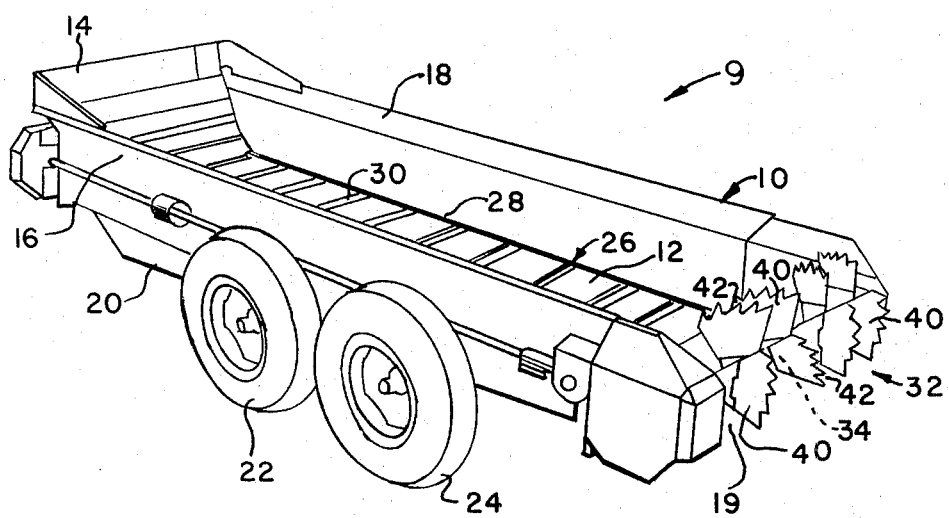
FIG. 1 is a perspective view of the spreader taken from the rear.

In the following description right hand and left hand reference is determined by standing to the rear of the manure spreader and facing the direction of travel.

The reference numeral 9 indicates generally a manure spreader having an open ended spreader box 10 comprising a bottom 12, a front wall 14, and two sidewalls designated by the reference numerals 16 and 18, respectively. The spreader box 10 is mounted upon frame 20 which is supported for travel across the ground by right and left pairs of wheels 22 and 24 (only one wheel of each pair being shown).

Manure spreaders are generally provided with a device for transporting materials placed within the confines of the spreader along the length of the spreader to the discharge area. Spreader 9 is provided with a bed conveying device 26 positioned above the bottom 12 of the spreader box 10. The device is comprised of endless chains 28 running adjacent the sidewalls 16 and 18 of the spreader box. These longitudinal chains have connected between then slats 30, which extend across the width of the spreader box 10 and which, upon activation, transport material across the entire length of the spreader box. The bed conveying device 26 is driven in the conventional manner with power supplied to it through a power takeoff shaft connected to the front of the spreader but which is not shown.

The spreader is equipped with an unloading and spreading mechanism 32 disposed between the sidewalls 16 and 18 of the spreader box 10 and in the immediate vicinity of the discharge opening 19. The unloading and spreading mechanism 32 consists of a rotatable shaft 34, journalled between the two sidewalls of the spreader box at 36 and 38. Mounted on said shaft are paddles 40 which operate to transport material out of and away from the spreader box 10. These paddles are formed with outer ends 42 having a saw tooth configuration to enable said paddles to engage, shread and grip the material with which it comes into contact. These paddles are mounted on mounting means 44 which are secured to the rotatable shaft 34. As can best be seen in FIG. 2, the paddles 40 are aligned at a particular angle to the longitudinal axis of shaft 34. This angle, approximately 30 degrees, has been determined to provide the optimum spreading and unloading characteristics of this particular type paddle design. The paddles are mounted from the sidewalls to the center of the spreader box and are identical in every respect except that the paddles designated as right-hand paddles are positioned in reverse of the paddles designated as left-hand paddles and vice versa. This positioning creates greater unloading and spreading capabilities since the material engaged by the paddles 40 will be discharged towards the respective sides of the spreader. This eliminates the possibilities that material will be either discharged solely to one side or the other, or that the mechanism will have a paddle having a spreading pattern which would overlap another paddle's spreading pattern, thereby interferring with a portion of the trajectory inherent in this particular design.

With the type of positioning and alignment of the paddles as previously described and generally depicted in the U.S. Pat. No. to C. A. Smith et al, it has been found that some material moved into the general area of the unloading and spreading mechanism 32, by the bed conveying device 26, when contacted by the paddles positioned closest to the respective sidewalls 16 and 18 of the spreader box 10, would be packed and compressed between the sidewalls and the end paddles mounted on shaft 34. This compaction of material was attributed to the fact that since the leading edge A of the end paddles traveled further away from the respective sidewalls than the trailing edge B, the material would contact the body of the paddle first rather than the edge of the paddle thereby compressing the material between the body of the paddle and the sidewalls of the spreader box. Further, it was found that material which becomes compressed often solidifies and forms an obstacle which subjects said end paddle, as well as the entire unloading and spreading mechanism, to unnecessary stresses during normal operation. Also the compaction by the end paddle of material against the sidewalls of the spreader prevents a considerable quantity of material from being unloaded and spread properly.

Figure 2:
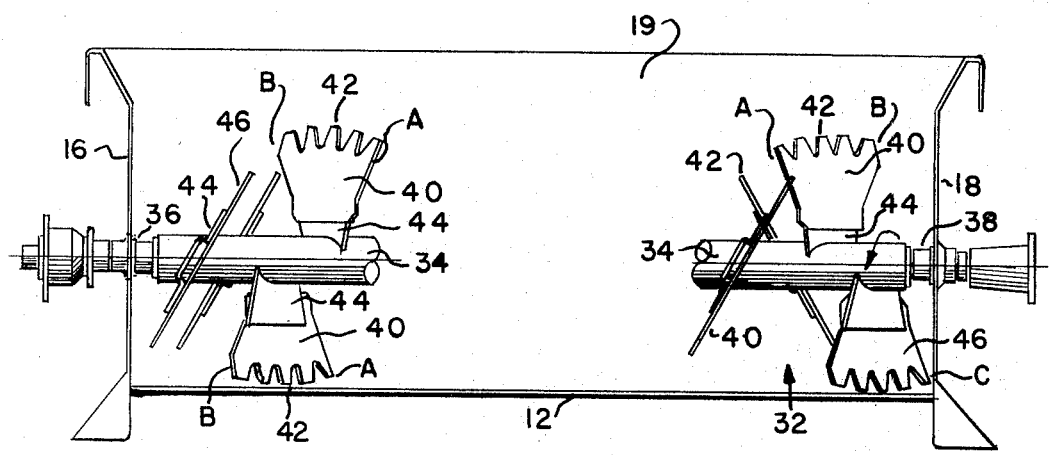
FIG. 2 is an end view of a spreader showing the alignment and construction of the paddles comprising the unloading and spreading mechanism.
Figure 3:
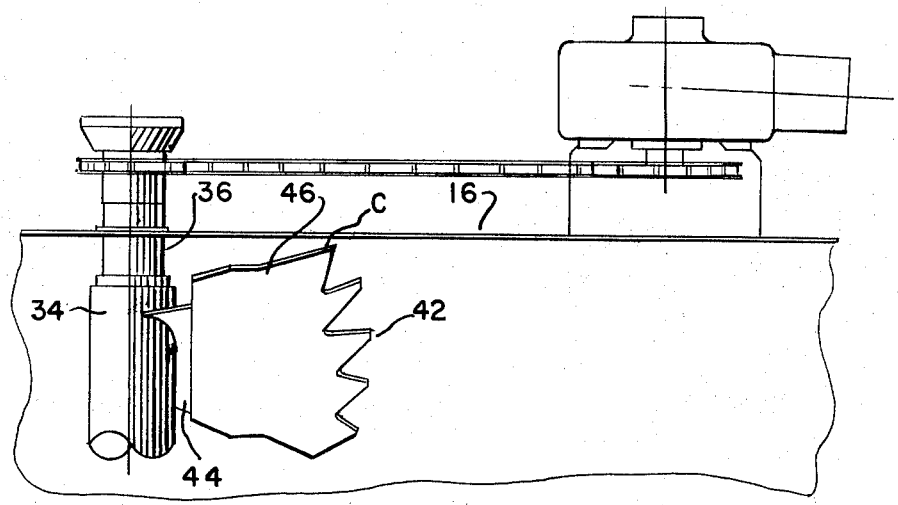
FIG. 3 is a plan view showing the configuration and alignment of the left-hand scraping paddle of the unloading and spreading mechanism.

As illustrated in FIGS. 2 and 3, in order to eliminate the compaction of material adjacent the respective sidewalls 16 and 18 of a spreader box 10, it was, and is necessary, to have paddles operating within said area, which have leading edges moving adjacent the respective sidewalls. To accomplish this, it was determined that scraping paddles 46 be placed so that their respective leading edges C will scrape material away from the sidewalls and distribute this material in such a way as to not interfere with the spreading pattern established by the other paddles of the mechanism. To achieve this desired result, scraping paddles 46 are placed at either end of the rotating shaft 34. It was also necessary to create in these paddles a leading edge C capable of scraping and unloading material transported into the area adjacent the sidewalls of the spreader box, but which would not interfere with the spread pattern, or the dynamic balance of the entire assembly. To do this, it was necessary to reverse the pitch of the end paddles of the mechanism of the type set out in the Smith et al. U.S. Pat. No. 3,228,701 while keeping the angle of the paddles at a constant 30° to the longitudinal axis of the rotating shaft. This type of positioning creates a leading edge which moves adjacent the sidewalls of the spreader box and which functions in the desired manner. Therefore, by reversing the pitch of the paddles placed at the respective ends of the rotating shaft 34, the end paddles will have exactly the same configuration as the other paddles of the unloading and spreading mechanism 32, except that it will have a leading edge C capable of scraping material out of the area adjacent the respective sidewalls 16,18 of the spreader box 10, and unloading and spreading material, without interferring with the established successful operation of the rest of the unloading and spreading mechanism.

OPERATION

The open ended spreader box 10 after being filled with material is transported by the farmer, to his fields, for distribution. Upon reaching the desired area, the bed conveying device 26 and the unloading and spreading mechanism 32 of the spreader are engaged. As the farmer is proceeding through his field, the conveying device 26 moves material towards the discharge opening 19 of the spreader box 10 where the unloading and spreading mechanism is operating. When material in the spreader box reaches the edges of the paddles 40, mounted on the rotating shaft 34, it is sheared from the mass of material from which it came and transported tangentially from the mechanism by the rotating paddles. Due to the configuration and alignment of the paddles, the material released tangentially from said paddles is distributed evenly behind the spreader. The scraping paddles 46, which are mounted on either end of the shaft 34, rotate with the mechanism to engage, discharge and spread any material that has become positioned adjacent sidewalls 16,18 of the spreader box 10.

While the preferred structure in which the principles of the present invention have been incorporated as shown and described above, it is to be understood that the invention is not to be limited to the particular details, shown and described above, but that, in fact, widely different means may be employed in the practice of the broader aspects of the invention.

Having thus described my invention, what I claim is:

1. A manure spreader comprising:
   a wheeled frame;
   an open ended spreader box mounted on said frame;
   a conveying device operable with said spreader box to transport stored material along the length of said box to the open end of said box;
   a means for unloading and spreading said stored material including a rotatable shaft mounted between the sidewalls of said spreader box and in the immediate vicinity of the opening included in said box, and paddles mounted on said shaft so that upon rotation of the shaft the paddles will move into the material being transported towards said opening in the box by the conveying device and engage, shread and discharge said material from the box;
   a scraping means positioned on each side of said unloading and spreading means, said scraping means including at least one of said paddles mounted on said rotatable shaft of said unloading and spreading means and disposed adjacent the sidewalls of the spreader box, each of said paddles having a leading edge which moves closer to the adjacent sidewalls of the spreader box than the trailing edge during the rotation of said scraping means.

2. The spreader, as described in claim 1, wherein said paddles are aligned on said rotatable shaft at an angle of approximately 30 degrees from the axis of the rotatable shaft so that on rotation of said shaft said leading edge of said paddles will move closer to the respective sidewalls of the spreader box than said trailing edge.

3. The spreader, as described in claim 1, wherein said paddles move, on rotation of the shaft, through the same radius as said paddles employed by the unloading and spreading means.

4. The spreader, as described in claim 3 wherein said paddles comprise rigid members having arcuate shaped outer ends with V-shaped notches in said outer ends for engaging, shreading and directing material said outer ends contact, and a mounting end for mounting said rigid members to said rotatable shaft.

5. In a manure spreader of the type having an open ended spreader box mounted on a wheeled frame, a conveying device operable with said box for conveying material placed within said box along its length to the open end of said box, an unloading and spreading means having a rotatable shaft mounted between the sidewalls of said box in the immediate vicinity of the opening included in said box, and paddles mounted on said shaft so that upon rotation of the shaft the paddles will move into the stored material being transported along the length of the box towards the open end included in said box and engage, shread and discharge said material from the box, wherein the improvement comprises: a scraping means positioned on each side of said unloading and spreading means mounted on said rotatable shaft so that any rotation by said shaft will be imparted to the scraping means, said scraping means comprising, at least one of said paddles mounted adjacent the sidewalls of the spreader box and at an angle of approximately 30 degrees from the axis of said rotatable shaft such that a leading and a trailing edge of said rigid members are created such that upon rotation of the unloading and spreading means said leading edge will move immediately adjacent the sidewalls of the spreader box thereby removing any material which may become lodged between said sidewall and said unloading and spreading means.

6. In combination with a manure spreader comprising:
a wheeled frame;
an open ended spreader box mounted on said frame;
a conveying device operable with said spreader box to transport stored material along the length of said box to the open end of said box;
a means for unloading and spreading said stored material having a rotatable shaft mounted between the sidewalls of said spreader box and in the immediate vicinity of the opening included in said box, mounting means operatively interconnected with said shaft, and paddles mounted in said mounting means so that rotation of the shaft will impart rotation to the paddles causing said paddles to move into the material being transported towards said opening in the spreader box by the conveying device, and engage, shread and discharge said material from the box;
scraping means positioned to each side of said unloading and spreading means, said scraping means comprising at least one of said paddles mounted on said rotatable shaft adjacent the sidewalls of the spreader box, a leading edge formed by the alignment of said paddles on said unloading and spreading means at an angle of approximately 30 degrees from the axis of the rotatable shaft such that upon rotation of the unloading and spreading means said leading edge will be the first portion of said paddles to contact the material while said leading edge moves closer to the adjacent sidewall of the spreader box than the trailing edge.

* * * * *